(12) United States Patent
Hendry

(10) Patent No.: US 12,355,987 B2
(45) Date of Patent: Jul. 8, 2025

(54) MEDIA FILE PROCESSING METHOD AND DEVICE THEREFOR

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 18/028,127

(22) PCT Filed: Sep. 24, 2021

(86) PCT No.: PCT/KR2021/012996
§ 371 (c)(1),
(2) Date: Mar. 23, 2023

(87) PCT Pub. No.: WO2022/065893
PCT Pub. Date: Mar. 31, 2022

(65) Prior Publication Data
US 2023/0328261 A1 Oct. 12, 2023

Related U.S. Application Data

(60) Provisional application No. 63/082,481, filed on Sep. 24, 2020.

(51) Int. Cl.
*H04N 19/174* (2014.01)
*H04N 19/46* (2014.01)

(52) U.S. Cl.
CPC ........... *H04N 19/174* (2014.11); *H04N 19/46* (2014.11)

(58) Field of Classification Search
CPC .... H04N 19/105; H04N 19/174; H04N 19/44; H04N 19/46; H04N 19/70; H04N 21/2343; H04N 21/236; H04N 21/434; H04N 21/4402
See application file for complete search history.

(56) References Cited

U.S. PATENT DOCUMENTS

| | | | |
|---|---|---|---|
| 2018/0277164 A1* | 9/2018 | Wang | H04N 21/2353 |
| 2018/0376126 A1* | 12/2018 | Hannuksela | H04N 19/59 |
| 2020/0228837 A1 | 7/2020 | Song et al. | |
| 2021/0377581 A1* | 12/2021 | Denoual | H04N 21/23439 |
| 2023/0027058 A1* | 1/2023 | Hannuksela | H04N 19/70 |

FOREIGN PATENT DOCUMENTS

| | | |
|---|---|---|
| KR | 10-2019-0131077 A | 11/2019 |
| KR | 10-2020-0085921 A | 7/2020 |
| KR | 10-2020-0110415 A | 9/2020 |
| WO | 2020/002122 A1 | 1/2020 |

* cited by examiner

*Primary Examiner* — Maria E Vazquez Colon
(74) *Attorney, Agent, or Firm* — BRYAN CAVE LEIGHTON PAISNER LLP

(57) ABSTRACT

According to one embodiment of the present disclosure, provided is a media file generating method performed by a media file generating device. The method comprises the steps of: constructing subpicture tracks comprising subpicture image data; constructing a base track referencing the subpicture tracks; and generating a media file comprising the subpicture tracks and the base track, wherein a sample of the base track forms a rectangular area without holes and overlaps, the holes indicate areas that are not covered by at least one of samples of the referenced subpicture tracks, and the overlaps indicate areas that are covered more than once by the samples of the referenced subpicture tracks.

5 Claims, 14 Drawing Sheets

MEDIA FILE PROCESSING METHOD AND DEVICE THEREFOR

CROSS-REFERENCE TO RELATED APPLICATIONS

This application is National Stage filing under 35 U.S.C. 371 of International Application No. PCT/KR2021/012996, filed on Sep. 24, 2021, which claims the benefit of U.S. Provisional Application No. 63/082,481 filed on Sep. 24, 2020, which is hereby incorporated by reference herein their entirety.

BACKGROUND OF THE DISCLOSURE

Field of the Disclosure

The present disclosure relates to a video/image coding technique and, more particularly, to a method and an apparatus for processing a media file on coded image information in a video/image coding system.

Related Art

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY OF THE DISCLOSURE

The present disclosure provides a method and an apparatus for increasing video/image coding efficiency.

The present disclosure also provides a method and an apparatus for generating a media file for coded image information.

The present disclosure also provides a method and an apparatus for processing the media file for the coded image information.

According to an embodiment of the present disclosure, there is provided a media file generation method performed by a media file generating apparatus. The method includes configuring subpicture tracks including subpicture image data, configuring a base track referencing the subpicture tracks, and generating a media file including the subpicture tracks and the base track, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to another embodiment of the present disclosure, there is provided a media file generating apparatus. The media file generating apparatus includes an image processor to configure subpicture tracks including subpicture image data and to configure a base track referencing the subpicture tracks, and a media file generator to generate a media file including the subpicture tracks and the base track, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to still another embodiment of the present disclosure, there is provided a media file processing method performed by a media file processing apparatus. The method includes obtaining a media file including subpicture tracks and a base track, parsing the subpicture tracks each including subpicture image data, and parsing the base track referencing the subpicture tracks, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to yet another embodiment of the present disclosure, there is provided a media file processing apparatus. The media file processing apparatus includes a receiver to obtain a media file including subpicture tracks and a base track and a medial file processor to parse the subpicture tracks each including subpicture image data and the base track referencing the subpicture tracks, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to still another embodiment of the present disclosure, there is provided a computer-readable digital storage medium which stores a media file generated by a media file generation method. In the computer-readable digital storage medium, the method includes configuring subpicture tracks each including subpicture image data, configuring a base track referencing the subpicture tracks, and generating a media file including the subpicture tracks and the base track, wherein a sample of the base track forms a rectangular area which does not have a hole and an overlap, the hole indicates an area not covered by at least one of samples of the referenced subpicture tracks, and the overlap indicates an area covered two or more times by the referenced subpicture tracks.

According to the present disclosure, a sample of a base track referencing subpicture tracks does not include an area not covered by at least one of samples of referenced subpicture tracks, and does not include an area covered two or more times by the samples of the referenced subpicture tracks. Accordingly, a relationship between the subpicture tracks and the base track may be clarified, thereby improving overall coding efficiency.

DESCRIPTION OF EXEMPLARY EMBODIMENTS

Figure 1:
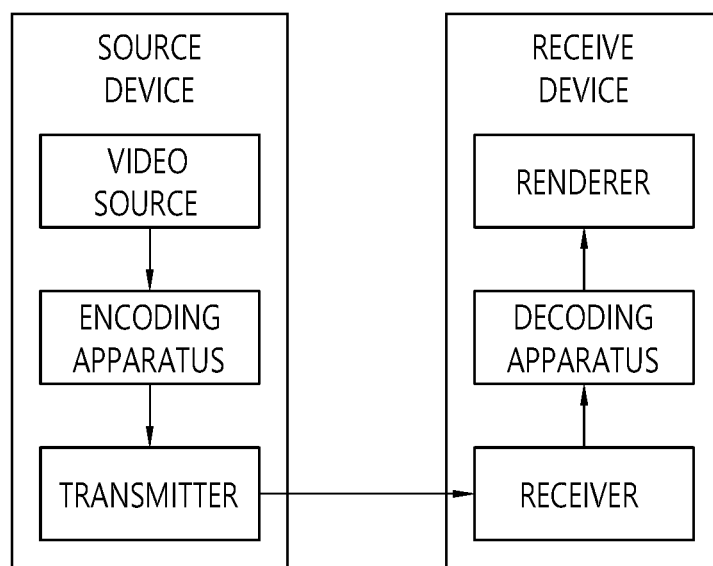
FIG. 1 schematically illustrates an example of a video/image coding system to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 schematically illustrates an example of a video/image coding system to which the embodiments of the present document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Figure 2:
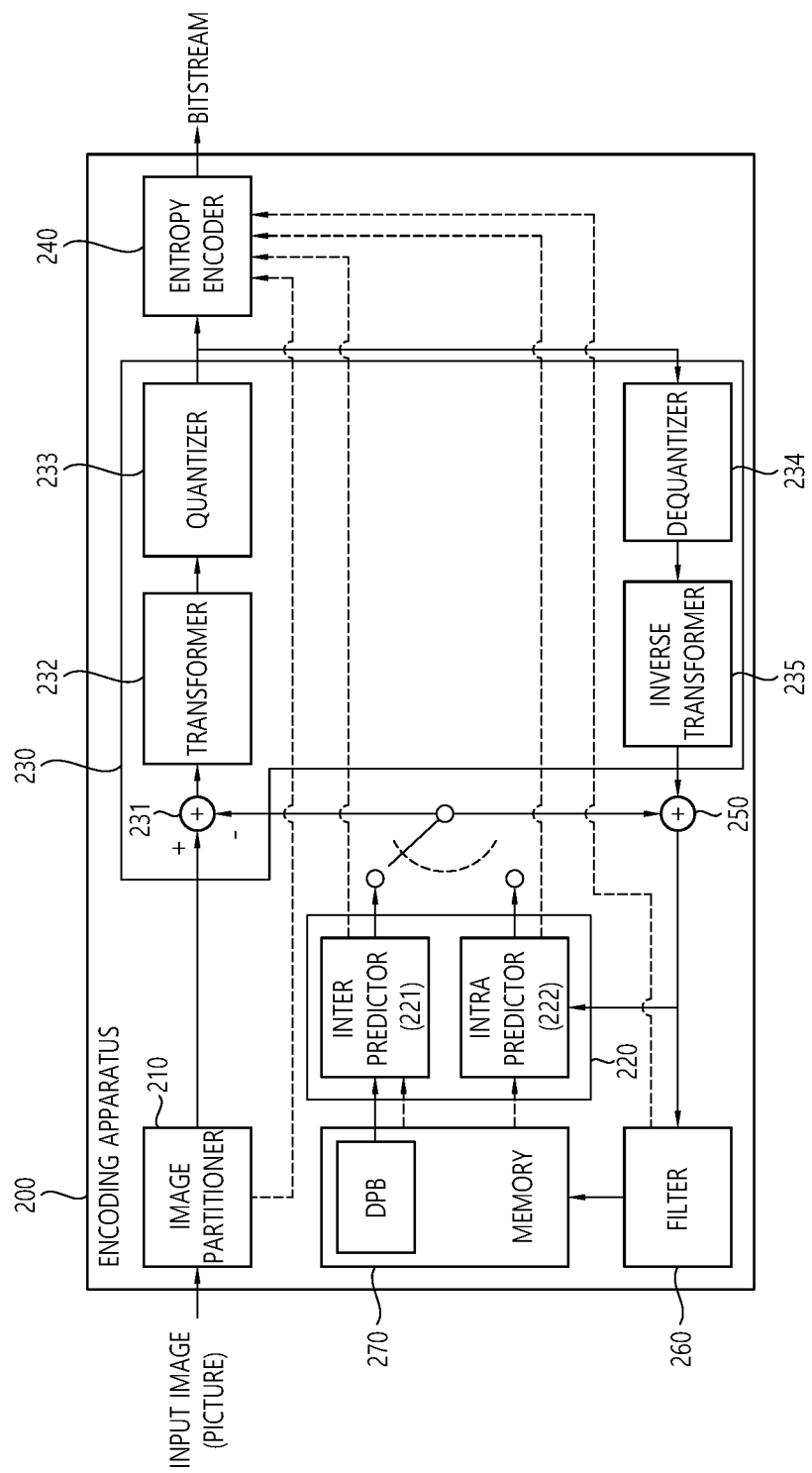
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
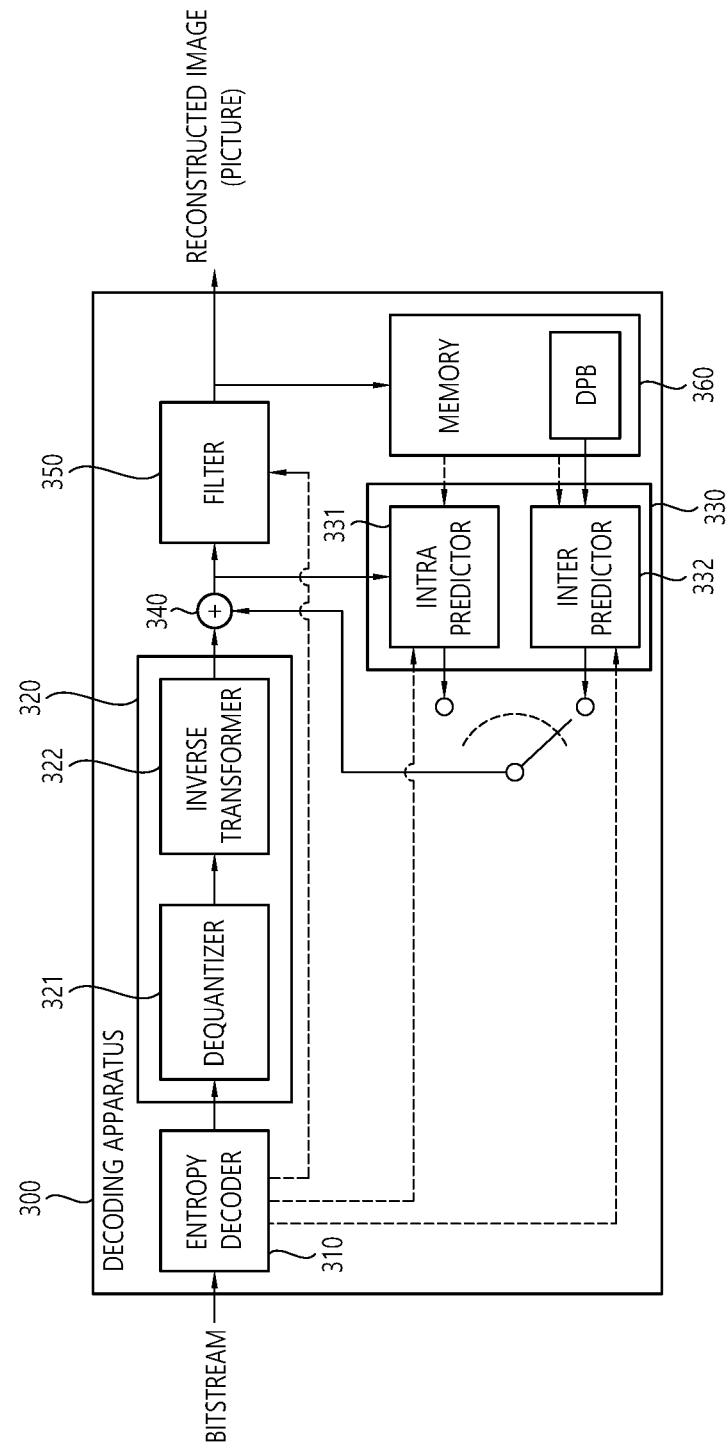
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
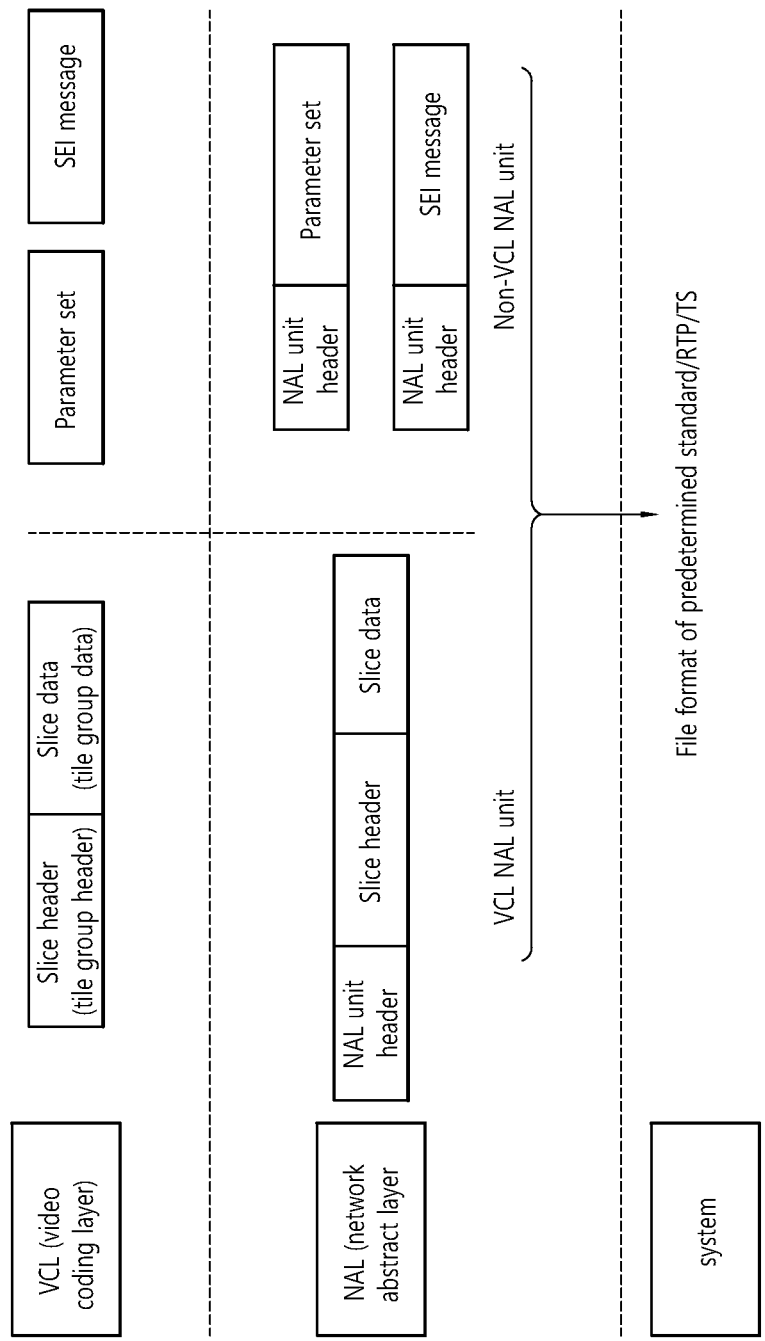
FIG. 4 exemplarily illustrates a layer structure for a coded video/image.

FIG. 4 exemplarily illustrates a layer structure for a coded video/image.

Referring to FIG. 4, a coded video/image may be divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

For example, VCL data including compressed image data (slice data), or a picture parameter set (PPS), a sequence parameter set (SPS), or a video parameter set (VPS), or a parameter set including a supplemental enhancement information (SEI) message additionally required in an image decoding process may be generated, in the VCL.

For example, in the NAL, header information (NAL unit data) is added to a raw byte sequence payload (RSRP) generated in the VCL to generate the NAL unit. In this case, the slice data, the parameter set, the SEI message, etc., generated in the VCL may be referred to, for the RBSP. The NAL unit header may include NAL unit type information specified according to RSRP data included in the corresponding NAL unit.

For example, as illustrated in FIG. 4, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Decoding Parameter Set (DPS) NAL unit: Type for the NAL unit including the DPS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Picture header (PH) NAL unit: Type for the NAL unit including the PH The above-described NAL unit types may have syntax information for the NAL unit type and the syntax information may be stored in the NAL unit header and signaled. For example, the syntax information may be nal_unit_type and the NAL unit type may be specified as a value of nal_unit_type.

Meanwhile, one picture may include a plurality of slices, and the slice may include a slice header and slice data. In this case, one picture header may be added for the plurality of slices (a set of the slice header and the slice data). The picture header (picture header syntax) may include information/parameters which may be commonly applied to a picture. The slice header (slice header syntax) may include information/parameters which may be commonly applied to a slice. APS (ASP syntax) or PPS (PPS syntax) may include information/parameters which may be commonly applied to one or more slices or pictures. SPS (SPS syntax) may include information/parameters which may be commonly applied to one or more sequences. VPS (VPS syntax) may include information/parameters which may be commonly applied to a plurality of layers. DPS (DPS syntax) may include information/parameters which may be commonly applied to an overall image. The DPS may include information/parameter related to concatenation of a coded video sequence (CVS).

In the present disclosure, the image/video information encoded from the encoding apparatus to the decoding apparatus and signaled in the form of the bitstream may include intra-picture partitioning related information, intra/inter prediction information, interlayer prediction related information, residual information, and in-loop filtering information, and may include information included in the APS, information included in the PPS, information included in the SPS, information included in the VPS, and/or information included in the DPS. Further, the image/video information may further include information of the NAL unit header.

Meanwhile, the above-described encoded image/video information may be configured based on a media file format in order to generate the media file. For example, the encoded image/video information may form a media file (segment) based on one or more NAL units/sample entries for the encoded image/video information. The media file may include a sample entry and a track. For example, the media file (segment) may include various records, and each record information related to an image/video or information related to the media file format. Further, for example, one or more NAL units may be stored in a configuration record (or decoder configuration record, or VVC decoder configuration record) field of the media file. Here, the field may also be called a syntax element.

For example, as a media file format to which the method/embodiment disclosed in the present disclosure may be applied, ISO Base Media File Format (ISOBMFF) may be used. The ISOBMFF may be used based on a lot of codec encapsulation formats such as an AVC file format, an HEVC file format, and/or a VVC file format and a lot of multimedia container formats such as an MPEG-4 file format, a 3GPP file format (3GP), and/or a DVB file format. Further, static media and metadata such as the image may be stored in a file according to the ISOBMFF in addition to continuous media such as audio and video. A file structuralized according to the ISOBMFF may be used for various purposes including local media file playback, progressive downloading of a remote file, segments for dynamic adaptive streaming over HTTP (DASH), containers and packetization instructions of contents to be streamed, recording of received real-time media streams, etc.

A 'box' to be described below may be an elementary syntax element of the ISOBMFF. An ISOBMFF file may be constituted by a sequence of boxes, and another box may be included in the box. For example, a movie box (a box in which a grouping type is 'moov') may include metadata for continuous media streams including the media file, and each stream may be displayed as the track in the file. The metadata may be included in a track box (a box in which the grouping type is 'trak'), and a media content of the track may be included in a media data box (a box in which the grouping type is 'mdat') or directly included in a separate file. The media content of the track may be constituted by a sequence of samples such as audio or video access units. For example, the ISOBMFF may specify tracks of types such as a media track including an elementary media stream, a hint track including media transmission instructions or representing a received packet stream, and a timed metadata track including time synchronized metadata.

Further, the ISOBMFF is designed for a storage usage, but is very useful even for streaming such as progressive download or DASH, for example. Movie fragments defined in the ISOMBFF may be used for a streaming usage. A fragmented ISOBMFF file may be represented by two tracks related to the video and the audio, for example. For example, when a random access is included after receiving the 'moov' box, all movie fragments 'mod' may be decoded together with related media data.

Further, the metadata of each track may include a coding or encapsulation format used for the track and a list of sample description entries providing initialization data required for processing the corresponding format. Further, each sample may be concatenated to one of the sample description entries of the track.

When the ISOBMFF is used, sample-specific metadata may be specified by various mechanisms. Specific boxes in a sample table box (a box in which the grouping type is 'stb1') may be standardized to cope with general requirements. For example, a sync sample box (a box in which the grouping type is 'stss') may be used for listing random access samples. When a sample grouping mechanism is used, samples may be mapped according to a four-character grouping type by a sample group sharing the same property specified as a sample group description entry. Various grouping types may be specified in the ISOBMFF.

Figure 5:
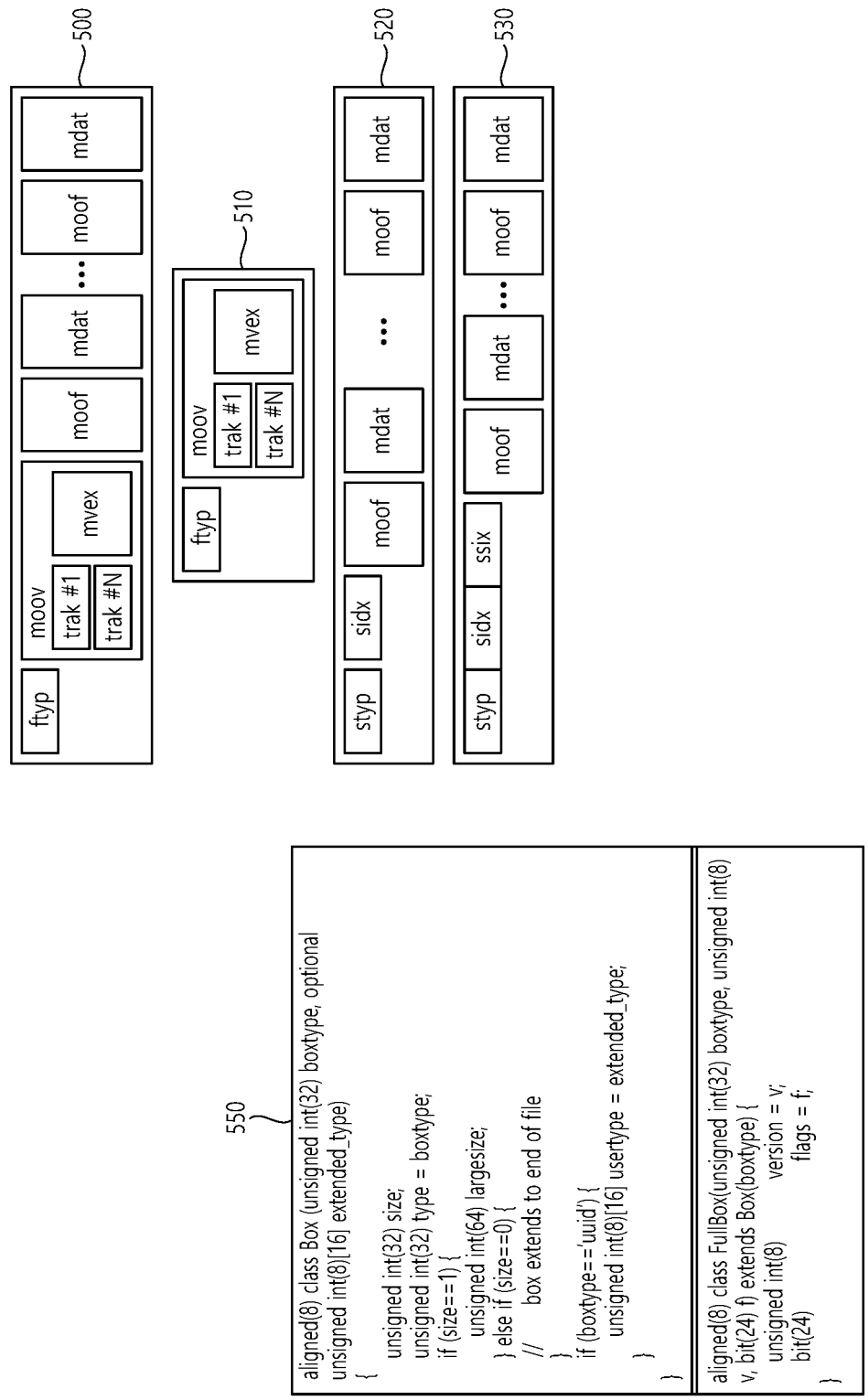
FIGS. 5 and 6 schematically illustrate an example of a media file structure.
Figure 6:
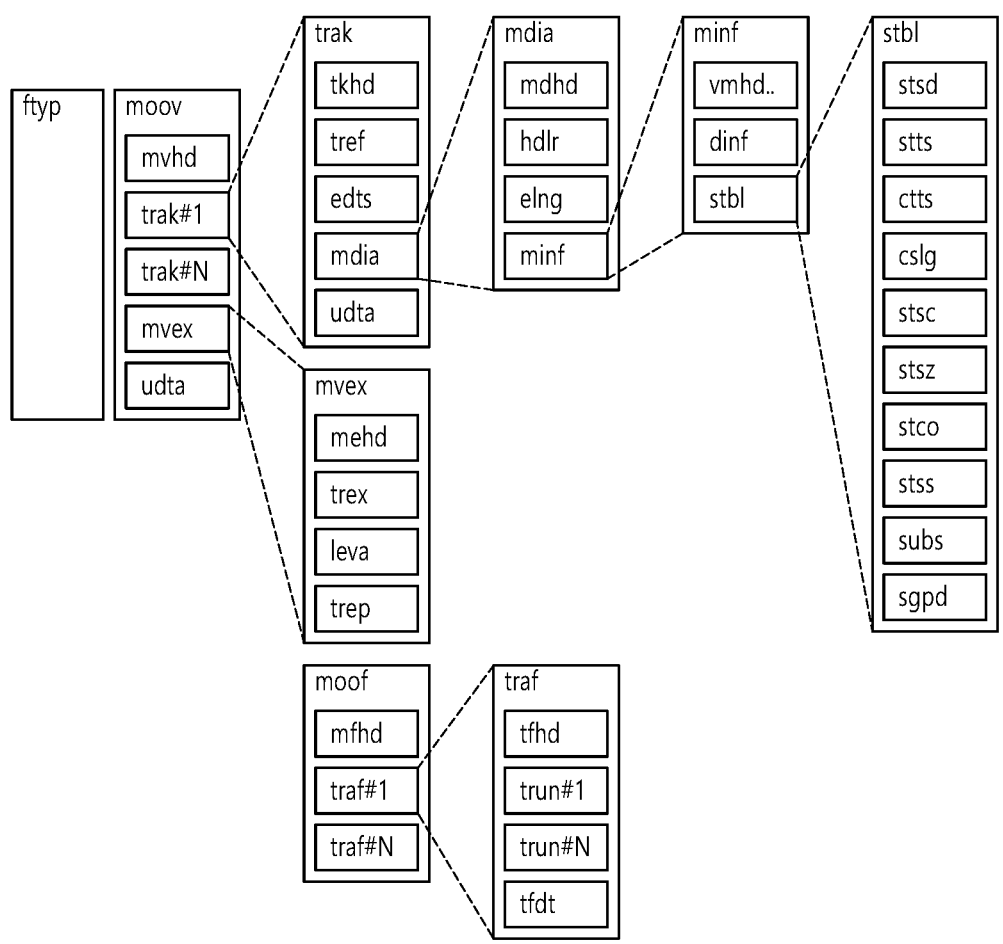

FIGS. 5 and 6 illustrate an example of a media file structure.

A media file may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file may be divided into a plurality of fragments (500). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (510) may include information related to media decoder initialization except media data. This file may correspond to the aforementioned initialization segment, for example. The initialization segment can include the aforementioned styp box and/or moov box.

A file of the illustrated embodiment (520) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (530), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (550). In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) for the video/image according to the present disclosure may be forwarded while being included in a DASH based adaptive streaming model.

Figure 7:
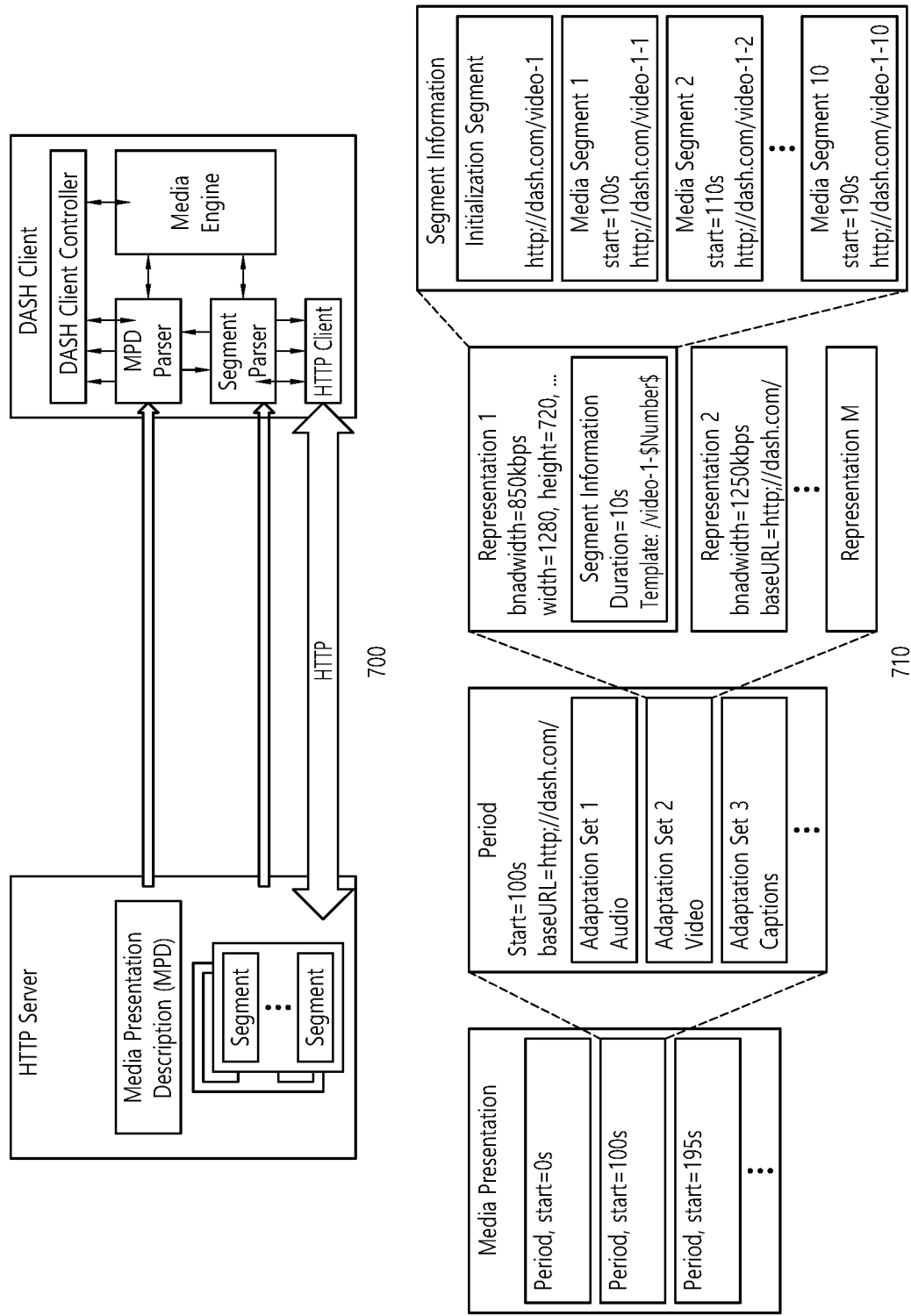
FIG. 7 illustrates an example of the overall operation of a DASH-based adaptive streaming model.

FIG. 7 illustrates an example of the overall operation of a DASH-based adaptive streaming model. The DASH-based adaptive streaming model according to an illustrated embodiment (700) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (710). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representation, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Meanwhile, a 'sample' to be described below may be all data related to a single time or a single element of one of three sample arrays (Y, Cb, and Cr) representing the picture. For example, when the terminology 'sample' is used in a context of the track (of the media file format), the 'sample' may mean all data related to the single time of the corresponding track. Here, the time may be a decoding time or a composition time. Further, for example, when the terminology 'sample' is used in the context of the picture, that is, when the 'sample' is used as a terminology of the picture like 'luma sample', the 'sample' may represent the single element in one of three sample arrays representing the picture.

To store VVC content, three types of elementary streams may be defined as follows.

Video elementary stream including no parameter set. Here, all parameter sets may be stored in a sample entry or sample entries.

Video and parameter set elementary stream which may include a parameter set and has a sample entry or sample entries in which the parameter set is stored.

Non-VCL elementary stream including non-VCL NAL units synchronized with an elementary stream included in a video track. Here, a VVC non-VCL track does not include a parameter set in sample entries.

Operating point information of the ISO base media file format (ISOBMF) for VVC may be signaled as a sample in a group box having a grouping type of 'vopi' or an entity group having a grouping type of 'opeg'. The operating point information may be needed to identify a sample and a sample entry for each operating point.

Operating point may be a temporal subset of an output layer set (OLS) which is identifiable with an OLS index and a highest value of TemporalId. Each operating point may be related to a profile, a tier, and a level (i.e., PTL) defining a conformance point of the operating point.

Applications may inform about various pieces of operating point information and a constitution provided by a given VVC bitstream using an operating point information sample group ('vopi'). Each operating point is related to OLS, maximum TemporalId value, profile, level, and tier signaling. All of the above information may be captured by a 'vopi' sample group. Apart from the above information, the sample group may also provide dependency information between layers.

When one or more VVC tracks exist for a VVC bitstream and no operating point entity group exists for the VVC bitstream, all of the following details may be applied.

There needs to be only one track carrying a 'vopi' sample group among the VVC tracks for the VVC bitstream.

All other VVC tracks of the VVC bitstream need to have a track reference of type 'oref' to the track carrying the 'vopi' sample group.

For a specific sample of a given track, a temporally collocated sample of a different track may be defined as a sample having the same decoding time as the specific sample. For each sample $S_N$ of a track $T_N$ having an 'oref' track reference to a track Tk carrying a 'vopi' sample group, the following may be applied.

When there is a temporally collocated sample Sk in the track Tk, the sample $S_N$ may be related to the same 'vopi' sample group entity as the sample Sk.

Otherwise, the sample $S_N$ may be related to the same 'vopi' sample group entity as a last sample of the track $T_k$ preceding the sample $S_N$ in a decoding time.

When several VPSs are referred to in a VVC bitstream, several entities may need to be included in a sample group description box in which grouping type 'vopi' is present. In a general case with a single VPS, it may be recommended to use a default sample group mechanism defined in ISO/IEC 14496-12 and to include an operating point information sample group in a sample table box instead of each track fragment.

For example, grouping_type_parameter may not be defined for SampleToGroupBox in which the grouping type is 'vopi'.

The syntax of the 'vopi' sample group including the operating point information, i.e., the operating point information sample group may be as in a table below.

TABLE 1

```
class VvcOperatingPointsRecord {
  unsigned int(8) num_profile_tier_level_minus1;
  for (i=0; i<=num_profile_tier_level_minus1; i++) {
    unsigned int(8) ptl_max_temporal_id[i];
    VvcPTLRecord(ptl_max_temporal_id[i]+1) ptl[i];
  }
  unsigned int(1) all_independent_layers_flag;
  bit(7) reserved = 0;
  if (all_independent_layers_flags){
    unsigned int(1) each_layer_is_an_ols_flag;
    bit(7) reserved = 0;
  } else
    unsigned int(8) ols_mode_idc;
  unsigned int(16) num_operating_points;
  for (i=0; i<num_operating_points) {
    unsigned int(16) output_layer_set_idx;
    unsigned int(8) ptl_idx;
    unsigned int(8) max_temporal_id;
    unsigned int(8) layer_count;
```

TABLE 1-continued

```
    for (j=0; j<layer_count; j++) {
        unsigned int(6) layer_id;
        unsigned int(1) is_outputlayer;
        bit(1) reserved = 0;
    }
    bit(6) reserved = 0;
    unsigned int(1) frame_rate_info_flag
    unsigned int(1) bit_rate_info_flag
    if (frame_rate_info_flag) {
        unsigned int(16) avgFrameRate;
        bit(6) reserved = 0;
        unsigned int(2) constantFrameRate;
    }
    if (bit_rate_info_flag) {
        unsigned int(32) maxBitRate;
        unsigned int(32) avgBitRate;
    }
}
unsigned int(8) max_layer_count;
for (i=0; i<max_layer_count; i++) {
    unsigned int(8) layerID;
    unsigned int(8) num_direct_ref_layers;
    for (j=0; j<num_direct_ref_layers; j++) {
        unsigned int(8) direct_ref_layerID;
        unsigned int(8) max_tid_il_ref_pics_plus1;
    }
}
class VvcOperatingPointsInformation extends VisualSampleGroupEntry ('vopi') {
    VvcOperatingPointsRecord oinf;
}
```

Further, semantics for the syntax of the operating point information sample group may be as in a table below.

TABLE 2 num_profile_tier_level_minus1 plus 1 gives the number of following profiles, tier, and level combinations as well as the associated fields.

ptl_max_temporal_id[i]: Gives the maximum TemporalID of NAL units of the associated bitstream for the specified i-th profile, tier, and level structure.
    NOTE: The semantics of ptl_max_temporal_id[i] and max_temporal_id of an operating point, given below, are different even though they may carry the same numerical value.

ptl[i] specifies the i-th profile, tier, and level structure.

all_independent_layers_flag, each_layer_is_an_ols_flag, ols_mode_idc and max_tid_il_ref_pics_plus1 are defined in ISO/IEC 23090-3.

num_operating_points: Gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

ptl_idx: Signals the zero-based index of the listed profile, level, and tier structure for the output layer set with index output_layer_set_idx.

max_temporal_id: Gives the maximum TemporalId of NAL units of this operating point.
    NOTE: The maximum TemporalId value indicated in the layer information sample group has different semantics from the maximum TemporalId Indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

frame_rate_info_flag equal to 0 indicates that no frame rate information is present for the operating point. The value 1 indicates that frame rate information is present for the operating point.

bit_rate_info_flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

max_layer_count: The count of all unique layers in all of the operating points that relate to this associated base track.

layerID: nuh_layer_id of a layer for which the all the direct reference layers are given in the following loop of direct_ref_layerID.

num_direct_ref_layers: The number of direct reference layers for the layer with nuh_layer_id equal to layerID.

direct_ref_layerID: nuh_layer_id of the direct reference layer.

For example, an operating point entity group may be defined to provide track mapping to an operating point and profile level information on the operating point.

When aggregating samples of a track mapped to the operating point described in the operating point entity group, an implicit reconstruction process does not need to remove a NAL unit any more to obtain a conforming VVC bitstream. A track belonging to the operating point entity group needs to have a track reference of type 'oref' for group_id indicated in the operating point entity group.

All entity_id values included in the operating point entity group need to belong to the same VVC bitstream. When present, OperatingPointGroupBox is included in GroupsListBox of movie-level MetaBox and is not included in file-level or track-level MetaBox. Here, OperatingPointGroupBox may represent the operating point entity group.

The syntax of the operating point entity group may be as in a table below.

TABLE 3

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
```

TABLE 3-continued

```
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id);
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_into_flag) {
            unsigned int(32) maxBitRate;
            unsigned int(32) avgBitRate;
        }
        unsigned int(8) entity_count;
        for (j=0; j<entity count; j++) {
            unsigned int(8) entity_idx;
        }
    }
}
```

Further, the semantics for the syntax of the operating point entity group may be as in a table below.

TABLE 4 num_profile_tier_level_minus1 plus 1 gives the number of following profiles, tier,
  and level combinations as well as the associated fields.
opeg_ptl[i] specifies the i-th profile, tier, and level structure.
num_operating_points: Gives the number of operating points for which the
  information follows.
output_layer_set_idx is the index of the output layer set that defines the operating
  point. The mapping between output_layer_set_idx and the layer_id values
  shall be the same as specified by the VPS for an output layer set with index
  output_layer_set_idx.
ptl_idx: Signals the zero-based index of the listed profile, level, and tier structure for the
  output layer set with index output_layer_set_idx.
max_temporal_id: Gives the maximum TemporalId of NAL units of this operating point.
  NOTE: The maximum TemporalId value indicated in the layer information sample group has different semantics from
  the maximum TemporalId indicated here. However, they may carry the same literal numerical values.
layer_count: This field indicates the number of necessary layers, as defined ISO/IEC
  23090-3, of this operating point.
layer_id: provides the nuh_layer_id values for the layers of the operating point.
is_outputlayer: A flag that indicates if the layer is an output layer or not. A one indicates
  an output layer.
frame_rate_info_flag equal to 0 indicates that no frame rate information is present
  for the operating point. The value 1 indicates that frame rate information is present for the
  operating point.
bit_rate_info_flag equal to 0 indicates that no bitrate information is present for
  the operating point. The value 1 indicates that bitrate information is present for the
  operating point.
avgFrameRate gives the average frame rate in units of frames/(256 seconds) for the
  operating point. Value 0 indicates an unspecified average frame rate.
constantFrameRate equal to 1 indicates that the stream of the operating point is of
  constant frame rate. Value 2 indicates that the representation of each temporal layer in the
  stream of the operating point is of constant frame rate. Value 0 indicates that the stream of
  the operating point may or may not be of constant frame rate.
maxBitRate gives the maximum bit rate in bits/second of the stream of the operating point,
  over any window of one second.
avgBitRate gives the average bit rate in bits/second of the stream of the operating point.
entity_count specifies the number of tracks that are present in an operating point.
entity_idx specifies the index to the entity_id list in the entity group that belongs to
  an operating point.

For example, a media file may include decoder configuration information on image/video content. That is, the media file may include a VVC decoder configuration record including the decoder configuration information.

When the VVC decoder configuration record is stored in a sample entry, the VVC decoder configuration record may include not only a parameter set but also the size of a length field used for each sample to indicate the length of a NAL unit included in the VVC decoder configuration record. The VVC decoder configuration record may be externally framed (the size of the VVC decoder configuration record is provided in a structure including the VVC decoder configuration record).

The VVC decoder configuration record may also include a version field. A version in the present disclosure may define version 1 of the VVC decoder configuration record. An incompatible change in the VVC decoder configuration record may be indicated as a version number change. When a version number is not recognized, a reader does not need to decode the VVC decoder configuration record or a stream to which the record applies.

A compatible extension of the VVC decoder configuration record may not change a configuration version code. The reader needs to be ready to ignore unrecognized data which exceeds the definition of data which the reader understands.

When a track basically includes a VVC bitstream or is resolved through a 'subp' track reference, VvcPtlRecord needs to be present in the decoder configuration record. Further, when ptl_present_flag in the decoder configuration record of the track is 0, the track needs to have an 'ord.' track reference.

When the stream described in the VVC decoder configuration record is decoded, the values of syntax elements of VvcPTLRecord, chroma_format_idc, and bit_depth_minus8 may be valid for all activated parameter sets. In particular, the following constraints may be applied.

Profile indication general_profile_idc indicates a profile to which the stream related to the configuration record conforms.

Tier indication general_tier_flag may indicate a tier equal to or greater than a highest tier indicated in all parameter sets.

Each bit of general_constraint_info may be set only when all parameter sets set the bit.

Level indication general_level_idc may indicate a level of capability equal to or greater than a highest level indicated for a highest tier in all parameter sets.

Further, the following constraints may be applied to chroma_format_idc.

When the value of sps_chroma_format_idc defined in ISO/IEC 23090-3 is the same in all SPSs referenced by a NAL unit of the track, chroma_format_idc needs to be the same as sps_chroma_format_idc.

However, when pd_present_flag is equal to 1, chroma_format_idc needs to be the same as vps_ols_dpb_chroma_format[output_layer_set_idx] defined in ISO/IEC 23090-3.

Otherwise (i.e., when the above conditions are not satisfied), chroma_format_idc does not exist.

In addition, the following constraints may be applied to bit_depth_minus8.

When the value of sps_bitdepth_mimus8 defined in ISO/IEC 23090-3 is the same in all SPSs referenced by the NAL unit of the track, bit_depth_minus8 needs to be the same as sps_bitdepth_minus8.

However, when pd_present_flag is equal to 1, bit_depth_minus8 needs to be the same as vps_ols_dpb_bitdepth_minus8[output_layer_set_idx] defined in ISO/IEC 23090-3.

Otherwise (i.e., when the above conditions are not satisfied), bit_depth_minus8 does not exist.

The VVC decoder configuration record may provide not only other important format information used in a VVC video elementary stream but also an explicit indication of a chroma format and a bit depth. When color space indications in pieces of VUI information of two sequences are different, two different VVC sample entries may be required.

Further, a set of arrays carrying initialization NAL units may be present in the VVC decoder configuration record. The types of the NAL units may be restricted to represent only DCI, VPS, SPS, PPS, prefix APS, and prefix SEI NAL units. A reserved NAL unit type in ISO/IEC 23090-3 and in the present disclosure may be defined in the future, and the reader may need to ignore arrays with a reserved or unpermitted value of a NAL unit type.

The arrays may be in an order of DCI, a VPS, a SPS, a PPS, a prefix APS, and prefix SEI.

The syntaxes of the VvcPTLRecord and the VVC decoder configuration record may be as in Tables 5 and 6 below.

TABLE 5

```
aligned(8) class VvcPTLRecord(num_sublayers) {
    unsigned int(8) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    if (num_bytes_constraint_info > 0)
        unsigned int(8*num_bytes_constraint_info - 2)
    general constraint info;   for (i=num_sublayers - 2; i >= 0; i--)
        unsigned int(1) ptl_sublayer_level_present_flag[i];
    for (j=num_sublayers; j<=8 && num_sublayers > 1; j++)
        bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
        unsigned int(32) general_sub_profile_idc;
}
```

TABLE 6

```
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthsizeMinusOne;
    unsigned int(1) ptl_present_flag;
    if (ptl_present_flag) {
        VvcPTLRecord(numTemporalLayers) track_ptl;
        unsigned int(16) output_layer_set_idx;
    }
    unsigned int(1) chroma_format_present_flag;
    if (chroma_format_present_flag)
        unsigned int(2) chroma_format_idc;
    else
        bit(2) reserved = '11'b;
    unsigned int(1) bit_depth_present_flag;
    If (bit_depth_present_flag)
        unsigned int(3) bit_depth_minus8;
```

TABLE 6-continued

```
else
   bit(3) reserved = '111'b;
unsigned int(1) reserved= '1'b;
unsigned int(8) numOfArrays;
for (j=0; j < numOfArrays; j++) {
   unsigned int(1) array_completeness;
   bit(1) reserved = 0;
   unsigned int(6) NAL_unit_type;
   unsigned int(16) numNalus;
   for (i=0; i< numNalus; i++) {
      unsigned int(16) nalUnitLength;
      bit (8*nalUnitLength) nalUnit;
   }
  }
}
```

Further, the semantics for the syntaxes of the VvcPTL-Record and the VVC decoder configuration record may be as in a table below.

TABLE 7 general_profile_idc, general_tier_flag, general_sub_profile_idc, general_constraint_info, general_level_idc, ptl_frame_only_constraint_flag,ptl_multilayer_enabled_flag, sublayer_level_present,and sublayer_level_idc[i] contain the matching values for the fields general_profile_idc, general_tier_flag, general_sub_profile_idc, the bits in general_constraint_info( ), general_level_idc, ptl_multilayer_enabled_flag, ptl_frame_only_constraint_flag, sublayer_level_present, and sublayer_level_idc[i] as defined in ISO/IEC 23090-3, for the stream to which this configuration record applies.

avgFrameRate gives the average frame rate in units of frames/(256 seconds), for the stream to which this configuration record applies. Value 0 indicates an unspecified average frame rate.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.

ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain one or more individual layers that do not form an output layer set or individual sublayers excluding the sublayer with TemporalId equal to 0.

num_sub_profiles defines the number of sub profiles indicated in the decoder configuration record.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means to the VVC decoder, as specified in ISO/IEC 23090-3, for decoding the bitstream contained in the track.

chroma_format_present_flag equal to 0 specifies that chroma_format_idc is not present. chroma_format_present_flag equal to 1 specifies that chroma_format_idc is present.

chroma_format_idc indicates the chroma format that applies to this track. The following constraints apply for chroma_format_idc:
- If the value of sps_chroma_format_idc, as defined in ISO/IEC 23090-3, is the same in all SPSs referenced by the NAL units of the track, chroma_format_idc shall be equal to sps_chroma_format_idc.
- Otherwise, if ptl_present_flag is equal to 1, chroma_format_idc shall be equal to vps_ols_dpb_chroma_format[output_layer_set_idx], as defined in ISO/IEC 23090-3.
- Otherwise, chroma_format_idc shall not be present.

bit_depth_present_flag equal to 0 specifies that bit_depth_minus8 is not present. bit_depth_present_flag equal to 1 specifies that bit_depth_minus8 is present.

bit_depth_minus8 indicates the bit depth that applies to this track. The following constraints apply for bit_depth_minus8:
- If the value of sps_bitdepth_minus8, as defined in ISO/IEC 23090-3, is the same in all SPSs referenced by the NAL units of the track,bit_depth_minus8 shall be equal to sps_bitdepth_minus8.
- Otherwise, if ptl_present_flag is equal to 1, bit_depth_minus8 shall be equal to vps_ols_dpb_bitdepth_minus8[ output_layer_set_idx], as defined in ISO/IEC 23090-3.
- Otherwise,bit_depth_minus8 shall not be present.

TABLE 7-continued numArrays indicates the number of arrays of NAL units of the indicated type(s).
array_completeness when equal to 1 indicates that all NAL units of the given type are in the following array and none are in the stream; when equal to 0 indicates that additional NAL units of the indicated type may be in the stream; the default and permitted values are constrained by the sample entry name.
NAL_unit_type indicates the type of the NAL units in the following array (which shall be all of that type); it takes a value as defined in ISO/IEC 23090-2; it is restricted to take one of the values indicating a DCI, VPS, SPS, PPS, APS, prefix SEI, or suffix SEI NAL unit.
numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.
nalUnitLength indicates the length in bytes of the NAL unit.
nalUnit contains a DCI, VPS, SPS, PPS, APS or declarative SEI NAL unit, as specified in ISO/IEC 23090-3.

An operating point may be determined first to reconstruct an access unit from samples of multiple tracks carrying a multi-layer VVC bitstream. For example, when the VVC bitstream is represented by a plurality of VVC tracks, a file parser may identify tracks required for the selected operating point as follows.

For example, the file parser may find all tracks having a VVC sample entry. When the tracks include an 'oref' track reference to the same ID, the ID may be resolved as a VVC track or an 'opeg' entity group. The operating point may be selected from the 'opeg' entity group or a 'vopi' sample group suitable for decoding capacity and application purposes.

When the 'opeg' entity group exists, the 'opeg' entity group may represent a set of tracks which accurately represent the selected operating point. Thus, the VVC bitstream may be reconstructed from the set of tracks, and may be decoded.

When the 'opeg' entity group does not exist (i.e., when the 'vopi' sample group exists), a set of tracks necessary for decoding the selected operating point may be retrieved from 'vopi' and 'linf' sample groups.

To reconstruct the VVC bitstream from the plurality of VVC tracks carrying the bitstream, target highest value TemporalId may need to be determined first. When the plurality of tracks includes data for the access unit, samples within the tracks may be aligned based on sample decoding times. That is, a time-to-sample table may be used without considering edit lists.

In a case where the VVC bitstream is represented by the plurality of VVC tracks, when the tracks are combined into a single stream by increasing the decoding times, the decoding times of the samples may need to enable an access unit order to be correct as specified in ISO/IEC 23090-3. A sequence of access units may be reconstructed from each sample of required tracks according to an implicit reconstruction process described below. For example, the implicit reconstruction process of the VVC bitstream may be as follows.

For example, when an operating point information sample group exists, a required track may be selected based on a carrying layer and a reference layer as specified in the operating point information and layer information sample groups.

For example, when an operating point entity group exists, a required track may be selected based on information of OperatingPointGroupBox.

For example, when reconstructing the bitstream including a sublayer in which a VCL NAL unit has TemporalId greater than 0, all lower sublayers (i.e., sublayers in which a VCL NAL unit has smaller TemporalId) in the same layer may also be included in the resulting bitstream, and a required track may be selected accordingly.

For example, when reconstructing the access unit, picture units (specified in ISO/IEC 23090-3) from samples having the same decoding time may be disposed in the access unit in an ascending order of nuh_layer_id values.

For example, when the access unit is reconstructed with dependent layers and max_tid_il_ref_pics_plus1 is greater than 0, sublayers of reference layers for a VCL NAL unit having TemporalId less than or equal to max_tid_il_ref_pics_plus1−1 (indicated in the operating point information sample group) in the same layer may also be included in the resulting bitstream, and a required track may be selected accordingly.

For example, when the access unit is reconstructed with dependent layers and max_tid_il_ref_pics_plus1 is equal to 0, only IRAP picture units of reference layers may be included in the resulting bitstream, and a required track may be selected accordingly.

For example, when a VVC track includes a 'subp' track reference, each picture unit may be reconstructed as specified in Section 11.7.3 of ISO/IEC 23090-3 with additional constraints on EOS and EOB NAL units specified below. A process of Section 11.7.3 of ISO/IEC 23090-3 may be repeated for each layer of the target operating point according to a nuh_layer_id increasing order. Otherwise, each picture unit may be reconstructed as follows.

Reconstructed access units may be disposed in the VVC bitstream in an order of increasing decoding times, and duplicates of end of bitstream (EOB) and end of sequence (EOS) NAL units may be removed from the VVC bitstream as described further below.

For example, for access units belonging to different sublayers which are within the same coded video sequence of the VVC bitstream and are stored in the multiple tracks, there may be one or more tracks including an EOS NAL unit having a specific nuh_layer_id value in each sample. In this case, only one of the EOS NAL units may be retained in a last access unit (a unit having a longest decoding time) among the access units in the finally reconstructed bitstream and may be disposed after all NAL units except for the EOB NAL unit of the last access unit of the access units (if present), and the other EOS units may be deleted. Similarly, there may be one or more tracks including an EOB NAL unit in each sample. In this case, only one of the EOB NAL units may be retained in the finally reconstructed bitstream and may be disposed at the end of the access units, and the other EOB NAL units may be deleted.

For example, since a specific layer or a sublayer may be represented by one or more tracks, when finding a required track for the operating point, the required track may need to be selected from among a set of tracks carrying all of the specific layer or the sublayer For example, when no operating point entity group exists, a final required track may be selected from among tracks carrying the same layer or sublayer, and may then collectively carry some layers or sublayers still not belonging to the target operating point. The reconstructed bitstream for the target operating point may be carried in the final required track but may not include the layers or sublayers not belonging to the target operating point.

The VVC file format according to the present disclosure defines the following types of tracks.

a) VVC track: A VVC track represents a VVC bitstream by including a NAL unit in a sample and a sample entry and possibly by referencing other VVC tracks including other sublayers of the VVC bitstream and possibly by referencing VVC subpicture tracks. When a VVC track refers to VVC subpicture tracks, the VVC track is referred to as a VVC base track.

b) VVC non-VCL track: APSs, which carry ALF, LMCS, or scaling list parameters, and other non-VCL NAL units can be stored in and transmitted through a track that is separate from the track containing the VCL NAL units; this is the VVC non-VCL track.

c) VVC subpicture track: A VVC subpicture track may include either of the following.

For example, the VVC subpicture track may include a sequence of one or more VVC subpictures.

For example, the VVC subpicture track may include one or more complete slices forming a rectangular area.

A sample of a VVC subpicture track may include either of the following.

For example, the sample of the VVC subpicture track may include one or more complete subpictures specified in ISO/IEC 23090-3, which are contiguous in a decoding order.

For example, the sample of the VVC subpicture track may include one or more complete slices specified in ISO/IEC 23090-3, which form a rectangular area and are contiguous in a decoding order.

VVC subpictures or slices included in a random sample of the VVC subpicture track may be contiguous in decoding order.

The VVC non-VCL track and the VVC subpicture track enable optimal delivery of a VVC video in a streaming application as follows.

For example, the tracks may be respectively carried via independent DASH representations thereof, and a DASH representation including a subset of VVC subpicture tracks and a DASH representation including non-VCL tracks may be required for decoding and rendering of a subset of the tracks. This method may eliminate redundant transmission of APSs and other non-VCL NAL units.

A sample of the VVC track may be resolved with an access unit including a NAL unit described below in the following order.

AUD NAL unit (if present) when present in the sample (and first NAL unit)

Parameter set and SEI NAL unit included in a sample entry when the sample is a first sample in a sequence of samples related to the same sample entry NAL unit present in the sample including a PH NAL unit Content of a resolved sample (within a decoding time) which is time-aligned from VVC subpicture tracks referenced in a specified order in a 'spor' sample group description entry mapped to this sample excluding all VPS, DCI, SPS, PPS, AUD, PH, EOS and EOB NAL units (if present). The above track references may be resolved as follows.

For example, when a referenced VVC subpicture track is related to a VVC non-VCL track, a resolved sample of the VVC subpicture track may include a non-VCL NAL unit of a time-aligned sample in the VVC non-VCL track (if present).

NAL unit following the PH NAL unit in the sample

For example, the NAL unit following the PH NAL unit in the sample may include a reserved NAL allowed after a suffix SEI unit, a suffix APS NAL unit, an EOS NAL unit, an EOB NAL unit, or a VCL NAL unit.

'subp' track reference indices of the 'spor' sample group description entry may be resolved as follows.

When a track reference indicates a track ID of a VVC subpicture track, the track reference may be resolved with the VVC subpicture track.

Otherwise (when the track reference indicates an 'alte' track group), the track reference may be resolved to one of tracks of the 'alte' track group. For example, when a specific track reference index value is resolved for a specific track of a previous sample, the track reference may be resolved in a current sample as follows.

For example, the track reference may be resolved with the same specific track.

Alternatively, for example, the track reference may be resolved with any other track in the same 'alte' track group which includes a sync sample time-aligned with a current sample.

Since VVC subpicture tracks in the same 'alte' track group may need to be independent of any other VVC subpicture tracks referenced by the same VVC base track to avoid decoding mismatch, the following constraints may apply.

For example, all VVC subpicture tracks include VVC subpictures.

For example, subpicture boundaries are the same as picture boundaries.

For example, loop filtering is canceled across subpicture boundaries.

Meanwhile, when the reader selects a VVC subpicture track including a VVC subpicture having a set of different subpicture ID values from initial selection or previous selection, the following steps may be performed.

The 'spor' sample group description entry may be studied in order to determine whether the PPS or SPS NAL unit needs to be changed.

When the 'spor' sample group description entry represents whether start code emulation prevention bytes exist before or within subpicture IDs including the NAL unit, the RBSP is derived from the NAL unit (i.e., the start code emulation prevention bytes are removed). In a next step, after overriding, start code emulation prevention is performed again.

The reader uses subpicture ID length information and a bit position within the 'spor' sample group entry in order to determine which bits are overwritten to update the supicture ID to a selected subpicture ID.

When the subpicture ID value of the PPS or SPS is initially selected, the reader needs to write the PPS or SPS with each subpicture ID value selected in the reconstructed access unit.

When the subpicture ID values of the PPS and the SPS are changed as compared with the previous PPS and SPS having the same PPS ID value or SPS ID value, respectively, the reader needs to include copies of the previous PPS and SPS (when each of the PPS or SPS having the same PPS or SPS ID value does not exist in the access unit) and needs to write the PPS and the SPS with the updated subpicture ID values of the reconstructed access unit, respectively.

In the current specification of carriage of VVC in the ISOBMFF, a base track may include one or more track references of the 'subp' type. However, the draft specification may have the following problems.

A base track is basically a track in which a picture reconstructed from a sample of a referenced subpicture track is decodable by a VVC decoder. To this end, the picture reconstructed from the sample of the referenced subpicture track of the base track forms a conforming picture specified by the VVC specification, and the picture is required to have a rectangular shape, not to have a hole (i.e., an area in the picture which is not covered by any subpicture), and not to have an area covered by two or more subpictures.

A subpicture track may not be referenced by any VVC base track. Since the subpicture track may not be played/rendered without a base track, the subpicture track is unnecessary redundancy and needs to be avoided.

Accordingly, the present disclosure proposes a solution to the above problem. Proposed embodiments may be applied separately or in combination.

For example, there is a constraint that a picture (i.e., a VVC sample) reconstructed/resolved from samples of all subpicture tracks referenced by a VVC base track needs to be a conforming picture as specified in ISO/IEC 23090-3 (or VVC).

For example, the picture (i.e., a VVC sample) reconstructed/resolved from the samples of all subpicture tracks referenced by the VVC base track needs to have a rectangular shape.

For example, the picture (i.e., a VVC sample) reconstructed/resolved from the samples of all subpicture tracks referenced by the VVC base track does not need to have an area not covered by samples of the referenced subpicture track.

For example, the picture (i.e., a VVC sample) reconstructed/resolved from the samples of all subpicture tracks referenced by the VVC base track does not need to have an area covered by samples of one or more subpicture tracks.

In addition, for example, there is a constraint that a subpicture track in a VVC file needs to be referenced by at least one VVC base track.

For example, when a VVC track includes a 'subp' track reference, the VVC track may be referred to as a VVC base track, and the following may apply.

A sample of the VVC track does not need to include a VCL NAL unit.

A sample group of a 'spot' type specified in Section 11.7.7 of ISO/IEC 23090-3 needs to exist.

A sample of the VVC base track resolved from a sample of the 'subp' track reference needs to for a rectangular area which does not have a hole (i.e., an area not covered by the sample of the 'subp' track reference) and does not have an overlap (i.e., an area converted by samples of two or more 'subp' track references).

For example, the subpicture track needs to be referenced by at least one VVC base track.

Figure 8:
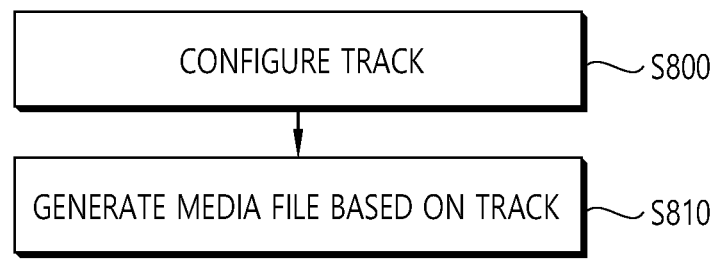
FIG. 8 exemplarily illustrates a method for generating a media file to which an embodiment proposed in the present disclosure is applied.

FIG. 8 illustrates a media file generation method to which an embodiment proposed in the present disclosure is applied.

Referring to FIG. 8, a first apparatus may configure a track (S800). For example, the first apparatus may configure the track according to the foregoing embodiment. For example, the first apparatus may refer to a transmission end, an encoding end, or a media file generating end. For example, the first apparatus may configure subpicture tracks and a base track. The first apparatus may include an encoder.

The first apparatus may generate a media file based on the track (S810). For example, the first apparatus may generate the media file based on the track according to the foregoing embodiment.

Figure 9:
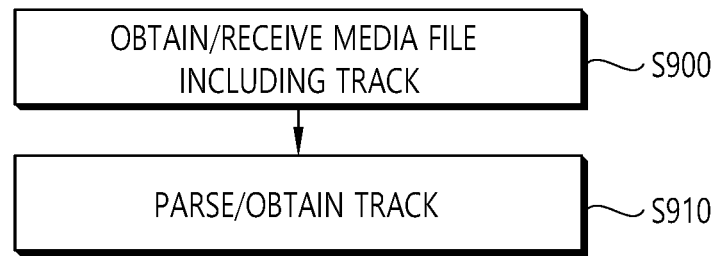
FIG. 9 exemplarily illustrates a method for decoding a media file generated by applying the embodiment proposed in the present disclosure.

FIG. 9 illustrates a method for decoding a media file generated by applying an embodiment proposed in the present disclosure.

Referring to FIG. 9, a second apparatus may obtain/receive a media file including a track (S900). For example, the second apparatus may obtain/receive the media file including the track according to the foregoing embodiment. For example, the second apparatus may refer to a reception end, a decoding end, or a rendering end.

For example, the media file may include the information described in Table 1 and/or Table 3.

The second apparatus may parse/obtain the track (S910). The second apparatus may parse/obtain tracks included in the media file. For example, the track may include a subpicture track or a base track. For example, the second apparatus may parse the subpicture track and the base track.

The second apparatus may generate a slice of one or more subpictures based on the track. The second apparatus may generate reconstructed samples based on the track. The second apparatus may obtain information required for image/video decoding based on the track.

Figure 10:
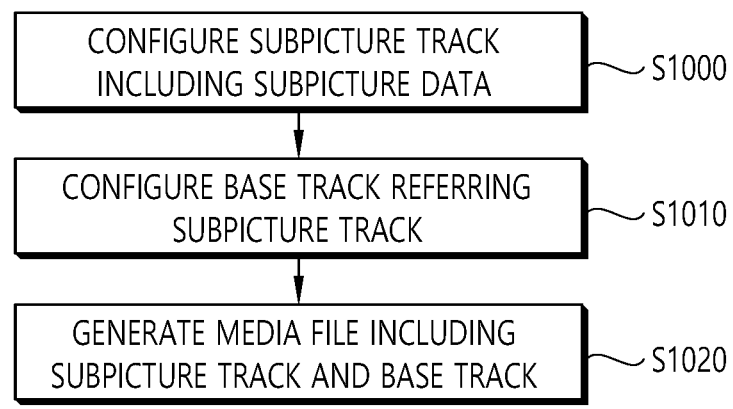
FIG. 10 schematically illustrates a method for generating a media file by an apparatus for generating a media file according to the present disclosure.

FIG. 10 schematically illustrates a media file generation method by a media file generating apparatus according to the present document. The method disclosed in FIG. 10 may be performed by a media file generating apparatus disclosed in FIG. 11. The media file generating apparatus may refer to the foregoing first apparatus. Specifically, for example, S1000 and S1010 of FIG. 10 may be performed by an image processor of the media file generating apparatus, and S1020 may be performed by a media file generator of the media file generating apparatus. Although not shown, a process of encoding a bitstream including image information may be performed by an encoder. The encoder may be included in the media file generating apparatus, or may be configured as an external component.

The media file generating apparatus configures subpicture tracks including subpicture data (S1000). Alternatively, for example, the media file generating apparatus may include an encoder, and may derive encoded image information.

The media file generating apparatus configures a base track referring the subpicture tracks (S1010). For example, a sample of the base track may form a rectangular area which does not include a hole and an overlap. The hole may refer to an area not covered by at least one of samples of the referenced subpicture tracks. The overlap may refer to an area covered two or more times by the samples of the referenced subpicture tracks.

For example, a subpicture track included in the media file may be referenced by at least one base track. For example, the base track referring the subpicture tracks may be configured without a VCL NAL unit. For example, the base track may contain a 'subp' track reference related to the subpicture tracks. For example, the base track may contain a 'spor' sample group related to an order of the 'subp' track reference.

For example, a sample of the subpicture track included in the media file may contain one or more complete subpictures, and the one or more complete subpictures may be contiguous in a decoding order.

For example, the sample of the subpicture track included in the media file may contain one or more complete slices, and the one or more complete slices may form a rectangular area. For example, the one or more complete slices may be contiguous in a decoding order.

The media file generating apparatus generates a media file including the subpicture tracks and the base track (S1020). The media file generating apparatus may generate a media file including a subpicture track and the base track.

Although not shown, the media file generating apparatus may store the generated media file in a (digital) storage medium, or may transmit the generated media file to a media file processing apparatus through a network or the (digital) storage medium. The network may include a broadcast network and/or a communication network, and the digital storage medium may include various storage media, such as a USB, an SD, a CD, a DVD, a Blu-ray, an HDD, and an SSD.

Figure 11:
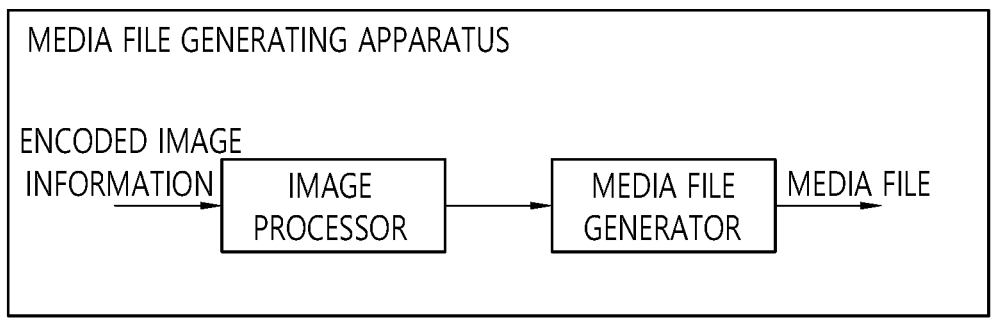
FIG. 11 schematically illustrates an apparatus for generating a media file, which performs a method for generating a media file according to the present disclosure.

FIG. 11 schematically illustrates the media file generating apparatus that performs a media file generation method according to the present disclosure. The method disclosed in FIG. 10 may be performed by the media file generating apparatus disclosed in FIG. 11. Specifically, for example, the image processor of the media file generating apparatus of FIG. 11 may perform S1000 and S1010, and the media file generator of the media file generating apparatus of FIG. 11 may perform S1020. Although not shown, a process of encoding a bitstream including image information may be performed by the encoder of the media file generating apparatus.

Figure 12:
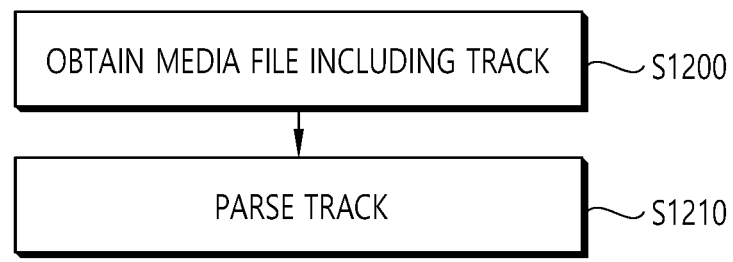
FIG. 12 schematically illustrates a method for processing a media file by an apparatus for processing a media file according to the present disclosure.

FIG. 12 schematically illustrates a media file processing method by a media file processing apparatus according to the present disclosure. The method disclosed in FIG. 12 may be performed by a media file processing apparatus disclosed in FIG. 13. The media file processing apparatus may refer to the foregoing second apparatus. For example, S1200 of FIG. 12 may be performed by a receiver of the media file processing apparatus, and S1210 may be performed by a media file processor of the media file processing apparatus. Although not shown, a process of decoding a bitstream based on a track may be performed by a decoder. The decoder may be included in the media file processing apparatus, or may be configured as an external component.

The media file processing apparatus obtains a media file including a track (S1200). For example, the media file processing apparatus may obtain the media file including the track through a network or a (digital) storage medium. The network may include a a broadcast network and/or a communication network, and the digital storage medium may include various storage media, such as a USB, an SD, a CD, a DVD, a Blu-ray, an HDD, and an SSD.

The media file processing apparatus parses the track (S1210). For example, the media file processing apparatus may parse/obtain the track.

Specifically, for example, the track may include subpicture tracks. That is, the media file processing apparatus may parse the subpicture tracks.

For example, the track may include a base track. That is, the media file processing apparatus may parse the base track.

For example, when a VVC track includes a 'subp' track reference, the VVC track may be referred to as a VVC base track.

For example, a sample of the base track may form a rectangular area which does not include a hole and an overlap. The hole may refer to an area not covered by at least one of samples of the referenced subpicture tracks. The overlap may refer to an area covered two or more times by the samples of the referenced subpicture tracks.

For example, a subpicture track included in the media file may be referred by at least one base track. For example, the base track referring the subpicture tracks may be configured without a VCL NAL unit. For example, the base track may contain a 'subp' track reference related to the subpicture tracks. For example, the base track may contain a 'spor' sample group related to an order of the 'subp' track reference.

For example, a sample of the subpicture track included in the media file may contain one or more complete subpictures, and the one or more complete subpictures may be contiguous in a decoding order.

For example, the sample of the subpicture track included in the media file may contain one or more complete slices, and the one or more complete slices may form a rectangular area. For example, the one or more complete slices may be contiguous in a decoding order.

Although not shown, the media file processing apparatus may decode a bitstream based on the track. For example, the media file processing apparatus may decode image information in the bitstream on the track based on the track, and may generate a reconstructed picture based on the image information.

Figure 13:
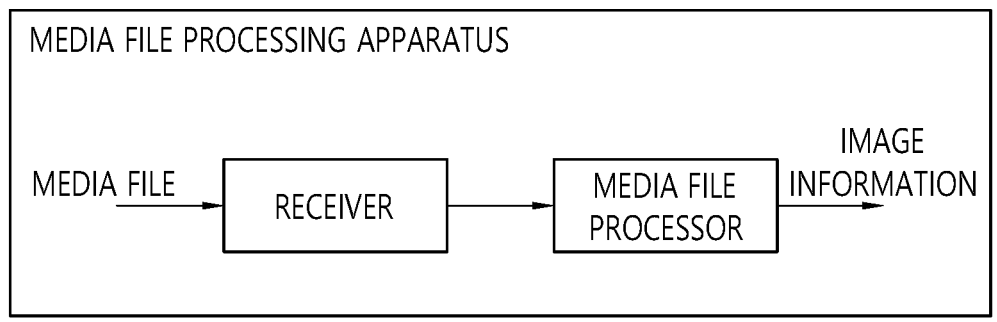
FIG. 13 schematically illustrates an apparatus for processing a media file, which performs a method for processing a media file according to the present disclosure.

FIG. 13 schematically illustrates the media file processing apparatus that performs a media file processing method according to the present disclosure. The method disclosed in FIG. 12 may be performed by the media file processing apparatus disclosed in FIG. 13. Specifically, for example, a receiver of the media file processing apparatus of FIG. 13 may perform S1200 of FIG. 12, and a media file processor of the media file processing apparatus of FIG. 13 may perform S1210 of FIG. 12. Although not shown, the media file processing apparatus may include the decoder, and the decoder may decode the bitstream based on the track.

According to the foregoing present disclosure, a sample of a base track referencing subpicture tracks does not include an area not covered by at least one of samples of referenced subpicture tracks, and does not include an area covered two or more times by the samples of the referenced subpicture tracks. Accordingly, a relationship between the subpicture tracks and the base track may be clarified, thereby improving overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 14:
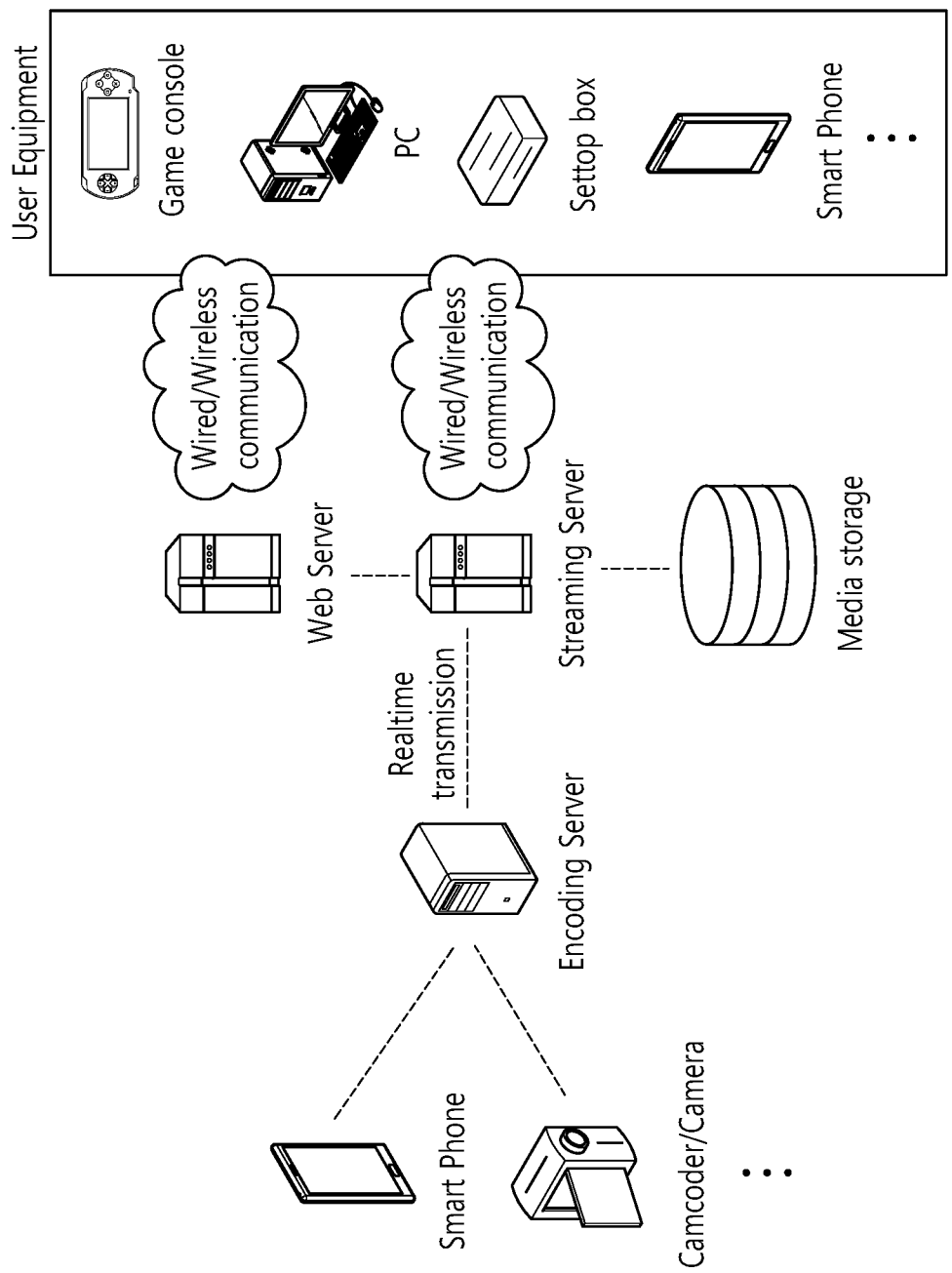
FIG. 14 illustrates a structural diagram of a contents streaming system to which the present disclosure is applied.

FIG. 14 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for generating a media file, the method comprising:
    configuring a versatile video coding (VVC) subpicture track including subpicture image data;
    configuring at least one VVC base track referring to the VVC subpicture track; and
    generating the media file comprising the VVC subpicture track and the at least one VVC base track,
    wherein the VVC subpicture track configured without video coding layer network abstraction layer (VCL NAL) units is referred based on the at least one VVC base track,
    wherein the at least one VVC base track includes track references related to the VVC subpicture track,
    wherein at least one sample of the VVC subpicture track comprised in the media file includes at least one complete slice,
    wherein the at least one complete slice forms a rectangular area,
    wherein, based on the VVC subpicture track configured without the VCL NAL units is referred based on the at least one VVC base track, at least one sample of the at least one VVC base track forms a rectangular area without a hole and an overlap,
    wherein the hole represents an area that is not covered by at least one of samples from the referred VVC subpicture track, and
    wherein the overlap represents an area that is covered more than twice by samples from the referred VVC subpicture track.

2. The method of claim 1, wherein the at least one VVC base track contains a 'spor' sample group related to an order of the 'subp' track references.

3. The method of claim 1, wherein a sample of a VVC subpicture track comprised in the media file contains one or more complete VVC subpictures, and wherein the one or more complete VVC subpictures are contiguous in a decoding order.

4. The method of claim 1, wherein the at least one complete slice is contiguous in a decoding order.

5. A method for processing a media file, the method comprising:

obtaining a media file comprising a versatile video coding (VVC) subpicture track and at least one VVC base track;

parsing the VVC subpicture track including subpicture image data; and parsing the at least one VVC base track referring to the VVC subpicture track, wherein the VVC subpicture track configured without video coding layer network abstraction layer (VCL NAL) units is referred based on the at least one VVC base track, wherein the at least one VVC base track includes track references related to the VVC subpicture track, wherein at least one sample of the VVC subpicture track comprised in the media file includes at least one complete slice, wherein the at least one complete slice forms a rectangular area, wherein, based on the VVC subpicture track configured without the VCL NAL units is referred based on the at least one VVC base track, at least one sample of the at least one VVC base track forms a rectangular area without a hole and an overlap, wherein the hole represents an area that is not covered by at least one of samples from the referred VVC subpicture track, and wherein the overlap represents an area that is covered more than twice by samples from the referred VVC subpicture track.

* * * * *